United States Patent Office 3,244,615
Patented Apr. 5, 1966

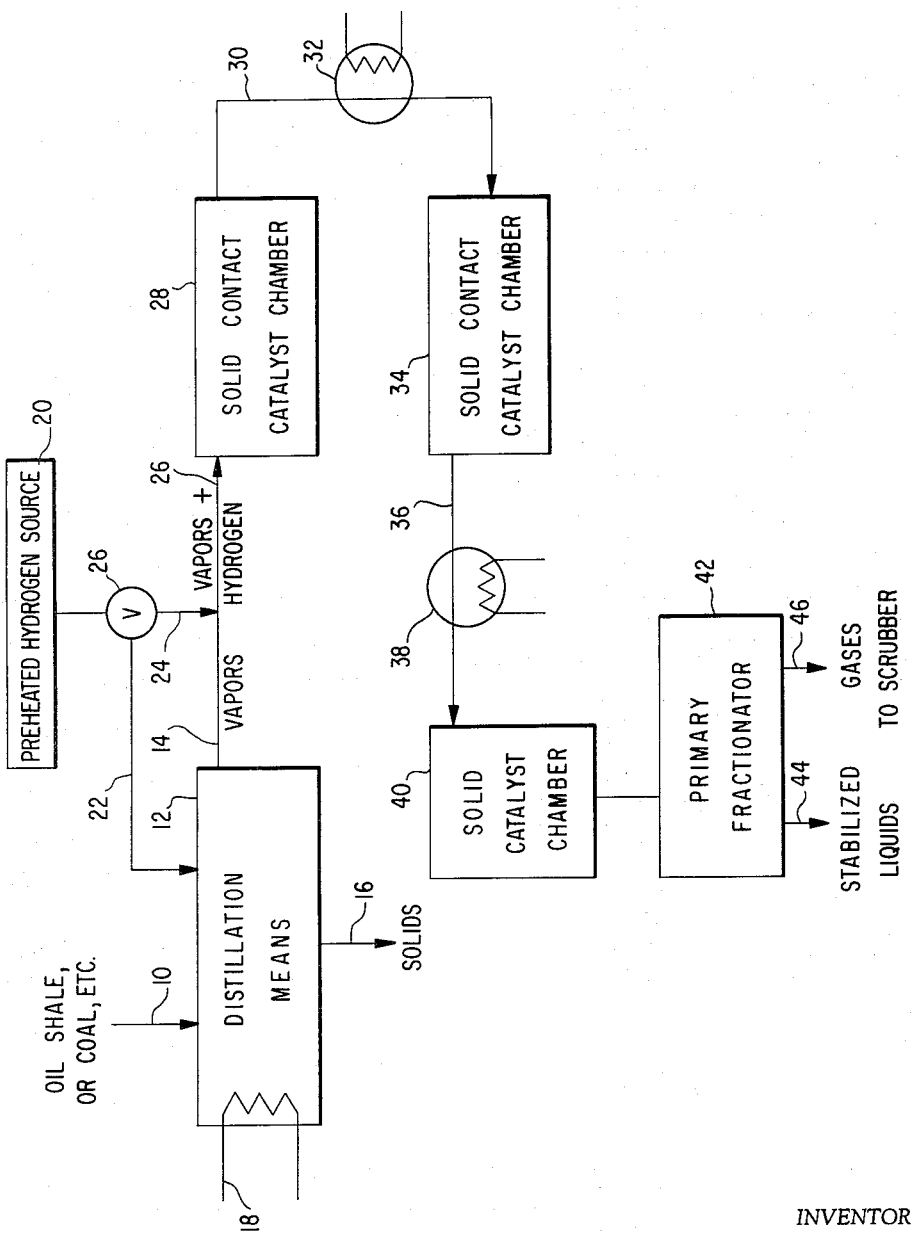

3,244,615
CONTACT CATALYSIS OF THE INITIAL VAPORS DESTRUCTIVELY DISTILLED FROM HYDROCARBONACEOUS SOLIDS TO CIRCUMVENT POLYMERIZATION AND OTHER SUBSEQUENT LIQUID PHASE INTERMOLECULAR REACTIONS
Morgan G. Huntington, Washington, D.C., assignor to Pyrochem Corporation, Salt Lake City, Utah, a corporation of Utah
Filed Sept. 6, 1963, Ser. No. 307,162
The portion of the term of the patent subsequent to Oct. 8, 1980, has been disclaimed
4 Claims. (Cl. 208—97)

This application is a continuation-in-part of my co-pending applications Serial Nos. 266,255 "Quadri-Phase Low Pressure Method for Partial Liquefaction of Coal," filed March 19, 1963, Serial No. 45,038, "Method for the Production of Light Oils from Oil Shale Through the Recombination of Hydrogen Originally Contained Therein," filed July 25, 1960, now U.S. Patent No. 3,106,521, and Serial No. 41,679, "Method for the Continuous Distillation of Coal and Other Hydrocarbonaceous Materials and for the Autogenous Hydrogenation of the Condensible Volatiles," filed July 8, 1960, now U.S. Patent No. 3,107,985.

This invention relates to the vapor phase total hydrogenation, i.e., saturation of olefins and to the removal of oxygen, sulfur and nitrogen as their respective hydrides from the primary vapors initially distilled from solid hydrocarbonaceous substances such as oil shale, asphaltenes, coal, bituminous impregnations; peat, wood and other vegetable matter.

Coals and other hydrocarbonaceous solids, such as kerogen in oil shale, asphaltenes from petroleum, and bitumen impregnating various hosts, are comprised of carbon, hydrogen, oxygen, sulfur and nitrogen. These hydrocarbonaceous substances have been identified as compounds having molecular weights in the order of 10,000. Oxygen, sulfur and nitrogen combined in chemically functional groups such as OH, CO, COOH, $NH_2$, CN, S, SH, etc., occur as integral parts of the original molecules.

As an example of the complex high molecular weight compounds found in a typical cross-bonded structure of high volatile coals, see the following formula:

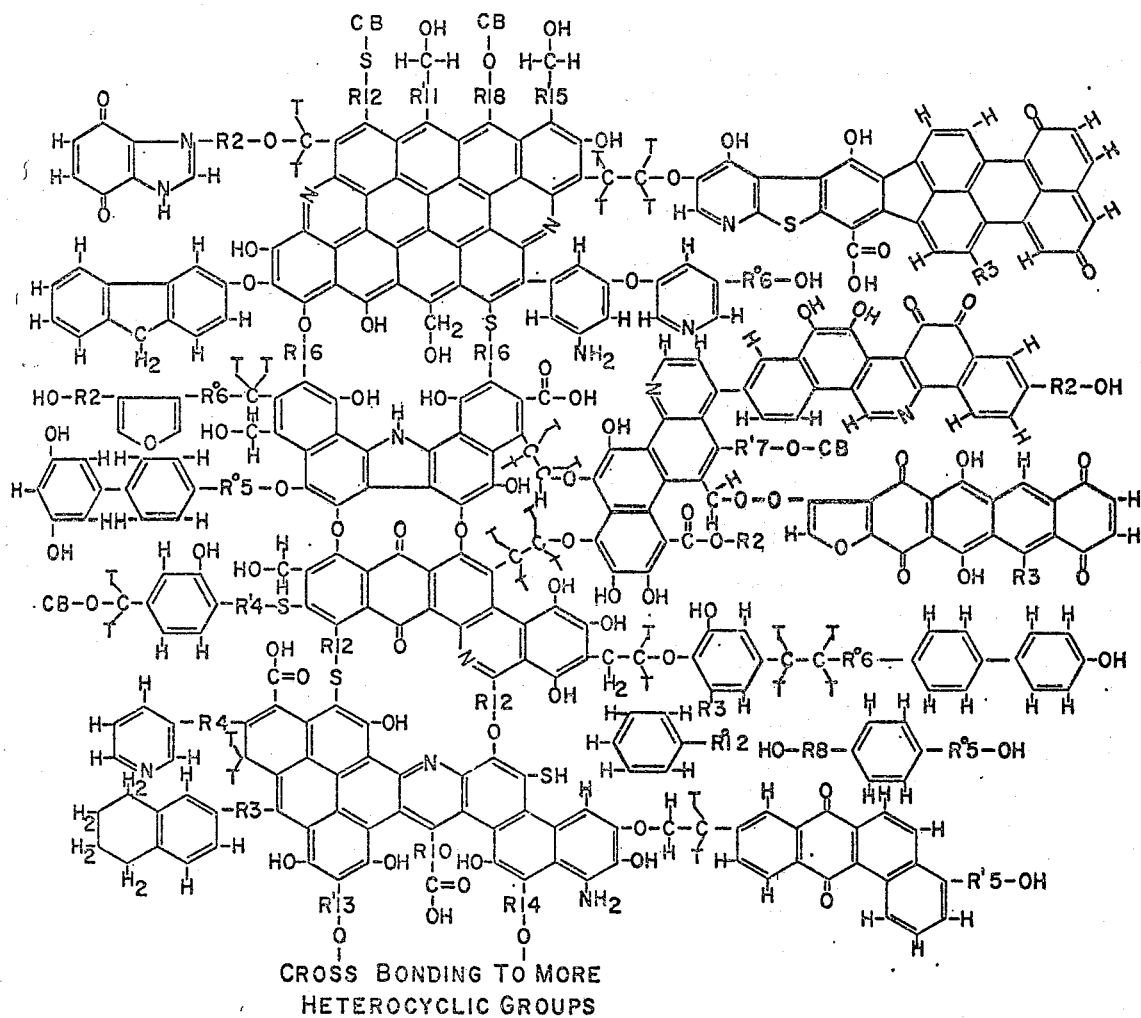

CROSS BONDING TO MORE
HETEROCYCLIC GROUPS

R°N=Alicyclic rings of N carbons.
RN=Alkyl side chain of N carbons.
R¹N=Unsaturated alkyl side chain of N carbons.
CB=Cross bonding by O or S to new heterocyclic groups with side chains.

T=Tetrahedral 3 dimensional C—C bonds, C—O bonds and C—S bonds.

When such large, complex molecules are destructively distilled by whatever means, about half of the liquid condensate is constituted of high boiling compounds having a molecular weight in the range of 1000 to 5000, or even higher. The composition of such heavy distillate is closely related to that of the substance from which it was distilled in that it contains oxygen, sulfur and nitrogen in about the same proportions as in the original compounds. Due to the intermolecular activity imparted by oxygen, sulfur and nitrogen and the high proportion of unsaturated hydrocarbons, the molecular weight changes from minute to minute and such instability may persist for years. However, if all olefins are promptly saturated and all oxygen is immediately removed from organic combinations, I have found that the primary liquid is entirely stable even though substantial amounts of sulfur and nitrogen remain and I have found that the average molecular weight lies between 110 and 150 when distilled below 950° F. with minimal thermal exposure at any pressure provided contact catalysis is immediately performed upon the initial vapor phase distillate. Sulfur and non-cyclic nitrogen (that is, nitrogen not chemically combined in a heterocyclic ring system) removal as hydrides lowers the average molecular weight somewhat farther.

A very great deal has been written by investigators of the thermal destructive distillation of coal and kerogen in oil shales and of the destructive hydrogenation of both, and many distillation processes have been proposed. However, all such processes (except those described in my copending patent applications No. 45,038 and No. 41,679, both allowed, and No. 266,255), have in common one pre-eminently defeating shortcoming in that about half of the condensate is nearly as complex and refractory as the original substance from which it was distilled and, therefore, cannot command a price commensurate with the cost of processing.

Evidently, the sooner that the primary vapors of destructive distillation can be entrained in hydrogen and brought into contact with a suitable catalyst, such as cobalt molybdate supported on alumina, the less chemically complex and the more useful and valuable is the primary condensate.

It is, therefore, the principal object of this invention to stabilize the condensable volatiles by contact catalysis at the earliest possible moment while in the initial vapor phase immediately following destructive distillation by whatever method, and irrespective of pressure, so long as the vapor phase is maintained.

It is a further object of this invention to cause the volatile stream, mixed with or entrained in one to seven mol volumes of hydrogen per mol of reactive unsaturates to promptly come in contact with a sufficient volume of suitable solid catalyst in order that all reactive olefins become immediately saturated.

It is a further object of this invention that the volatile stream with one to seven mols of hydrogen per mol of oxygenated compound be brought in contact with a suitable solid catalyst of sufficient volume that substantially all organic oxygen be removed at $H_2O$ vapor and, therefore, that all tar acids be destroyed at the earliest possible instant completing the stabilization of the subsequently condensed liquid.

It is also an object of this invention to remove surfur from organic combinations as $H_2S$ and non-cyclic nitrogen as ammonia, provided that there be sufficient hydrogen dilution, catalyst volume and pressure to accomplish such organic removal while in the initial vapor phase.

The foregoing and other objects, features and advantages of the invention will be apparent from the following more particular description of a preferred embodiment of the invention, as illustrated in the accompanying drawings.

In the drawing, the single figure is a diagrammatic flow sheet presentation of the inventive concept.

Referring to the drawing, coal or oil shale (primarily kerogen), or asphaltenes or any other initially solid hydrocarbonaceous material containing carbon, hydrogen, oxygen, sulfur and nitrogen, is introduced schematically at 10 to a suitable distillation means 12. The distillation means may be any suitable type of distillation means, either that previously known in the published art or that shown in my copending applications Serial Nos. 45,038 or 266,255 mentioned above, or in my issued U.S. Patent No. 2,969,266.

While in the distillation means the initially solid hydrocarbonaceous materials are subjected to thermal exposure to distill volatiles therefrom with a minimum of thermal alteration beyond the initial pyrolysis of the original solid material. The distilled matter will be in the vapor phase and will include permanent gases and condensable vapors. These primary volatile products of distillation may be withdrawn from the distillation means through line 14. The solids which are products of the distillation may be removed from the distillation means as indicated schematically at 16. The requisite heat for providing the thermal exposure is illustrated diagrammatically at 18 as a heat input to the distillation means.

Hydrogen, preferably preheated, is provided from a suitable source 20 and may either be introduced into the distillation means 12 together with the solid carbonaceous materials through line 22 or may be directly introduced into vapor phase output line 14 through line 24. A valve 26 is shown as controlling the path of the hydrogen. If the hydrogen is sufficiently preheated to furnish the thermal input from the thermal exposure in the distillation means, of course, this would replace the source of heat illustrated schematically at 18.

The vapors from the distillation together with the hydrogen are then passed through line 26 to a solid contact catalyst chamber 28 while still in the initial vapor phase. The initial vapor phase products of the pyrolysis have been thermally split from the large complex molecules having molecular weight in the order of 10,000 into smaller fragments which are molecules having a molecular weight less than 300. However, these smaller molecules are highly reactive for two primary reasons. First, because the unsaturation of the hydrocarbons, i.e., olefins, therein, and second because of the presence of oxygen in organic combination. However, by combining the vapor phase products with hydrogen while they are still in the initial vapor phase, and passing them across a solid contact catalyst, the unsaturated hydrocarbons will be saturated, i.e., the olefins will be saturated to paraffins. Also, the oxygen may be removed as water vapor and the tar acids, such as phenol, destroyed. That is, the purpose of the solid contact catalyst chamber 28 is to saturate the olefins and remove organic oxygen as water from the initial vapor phase products of distillation. This effectively prevents inter-reaction of the compounds in the distillate and the resulting formation of large molecules.

The vapors from the contact catalyst chamber 28 pass out through line 30 where they are subjected to temperature control in heat exchanger 32 and then may pass to a second solid contact catalyst chamber 34. The solid catalyst in chamber 34 is contacted with the vapors for the completion of the removal of oxygen as water and further for partial removal of noncyclic organic nitrogen as $NH_3$ and partial removal of organic sulfur as $H_2S$. The vapors from chamber 34 may be taken off line 36 through temperature control 38 and if desired passed to a further solid catalyst chamber 40. Solid catalyst chamber 40 will be used if the system pressure were greater than 100 p.s.i.a. and its purpose is to further accomplish sulfur removal to less than 100 p.p.m. and nitrogen removal excepting hetrocyclic compounds. The vapors from this catalyst chamber, or directly from catalyst chamber 34, may then be passed to a primary fractionator 42 and the condensed products therefrom will be in the form of stabilized liquids from line 44 which may be passed to secondary fractionator with reboiler and gases which are passed via line 46 to conventional gas scrubbers.

The contacting of the hydrogen entrained vapor phase volatiles with the solid catalyst while still in a vapor phase prevents polymerization and other subsequent liquid phase intermolecular reactions. The contacting with the catalyst can be accomplished at a sufficiently rapid rate by contacting the hydrogen entrained vapors over solid catalysts such as cobalt molybdate supported on alumina. The size and other parameters of the catalytic treatment including the liquid hourly space velocity and the catalyst contact time are chosen such that the olefins will be saturated and the oxygen in organic combination substantially removed from the particular distillate from the solid hydrocarbonaceous input material.

Furthermore, the particular distillation means, catalyst chambers, fractionators or heat exchangers, etc., used in this invention are of the type that are previously known in the art and the invention does not reside in particular apparatus but rather in the passing of the volatiles from thermal distillation of an initially solid hydrocarbonaceous material while these volatiles are still in their initial vapor phase over a suitable solid catalyst, to saturate the unsaturated hydrocarbons and to remove the oxygen in organic combination and thereby to stabilize the subsequently condensed liquid.

*A discussion of catalytic hydrogenation*

So far as obtaining maximum utility from coal and oil shale distillate is concerned, the desirable hydrogenation reactions are described as follows:

(1) The saturation of reactive olefins to stable paraffins (alkenes to alkanes) is readily effected by contact catalytic hydrogenation. In this case, hydrogen adds to each carbon double bond with the evolution of about 54 B.t.u. per pound mol.

Although this type of hydrogenation is an exothermic process and will proceed at one atmosphere and is relatively independent of system pressure, the saturation of olefins does not take place spontaneously because the amount of energy required to break a pi bond in the olefin or a sigma bond in hydrogen is too great. However, in the presence of a suitable catalyst the reaction proceeds rapidly to completion if heat is removed to hold the temperature at a suitably low level.

The mechanism of catalytic hydrogenation may be explained as a surface phenomenon in which the hydrogen molecule is adsorbed and, in effect, disassociated to atomic hydrogen. Likewise, the olefin is adsorbed to give a free biradical. Reaction of the atomic hydrogen and the free biradical leaves an adsorbed hydrogen atom and an adsorbed free radical. Further reaction gives a saturated hydrocarbon which is subsequently desorbed from the catalytic surface.

As an example of the saturation of an olefin,

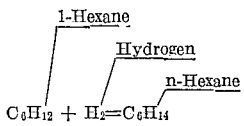

This is the typical example of the hydrogenation of an alkene (olefin) to an alkane (paraffin) and the equilibrium constant of the hydrogenation reaction is:

$$K = \frac{(\text{hexane})}{(\text{hexene})(\text{hydrogen})}$$

in which the partial pressures of the product and reactants are all first power functions and, therefore, proceed at rates which are relatively independent of pressure.

(2) The deoxidation of phenols of catalytic hydrogenation proceeds very rapidly to completion. (Please see "Hydrogenolysis Over Cobalt Molybdate Catalyst Removes Impurities Containing Sulfur, Oxygen and Nitrogen and Yields a Refined Product of High Purity," Industrial and Engineering Chemistry, vol. 53, No. 2, December, 1961, pages 993–996; also please see, Petroleum Refiner, "Gulf HDS Process Upgrades Crudes," May, 1955, page 157.)

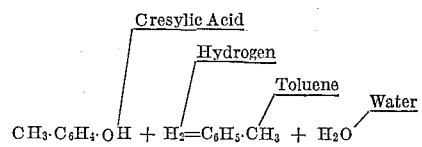

$$K = \frac{(\text{toluene})(\text{water})}{(\text{cresylic acid})(\text{hydrogen})}$$

in which the partial pressure of the products and reactants are all first power functions, and therefore, oxygen removal also proceeds to completion and is relatively independent of pressure.

In reducing cresylic acid to toluene, the molecular weight of the organic molecule drops from 108 to 92.

(3) The desulfurization of thiophene by catalytic hydrogenation is accomplished as follows:

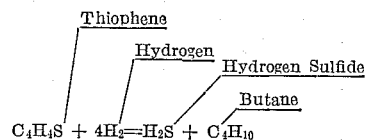

This reaction is typical of the desulfurization of hydrocarbons and the equilibrium constant K is found to be significant ($K=15$ at 980° F.) at relatively low pressures. The equilibrium constant of the desulfurization reaction is:

$$K = \frac{(\text{butane})(\text{hydrogen sulfide})}{(\text{thiophene})(\text{hydrogen})^4}$$

In reducing thiophene to butane by hydrogenation, the molecular weight of the organic molecule drops from 84 to 58.

(4) Nitrogen removal by catalytic hydrogenation from carbocyclic compounds such as analine, tolunitriles, etc., is also accomplished under rather mild conditinos. For example, a typical reaction is,

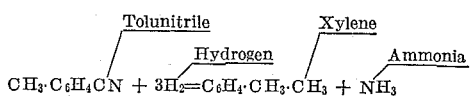

It must be pointed out that in the four types of catalytic hydrogen reactions exemplified above, no carbon to carbon bonds need be broken. Therefore, by lowering the energy of activation by catalytic surface adsorption of atomic hydrogen and free radicals, all four reactions can proceed to virtual completion within a few seconds under relatively mild conditions of pressure and temperature, producing stabilized hydrocarbons.

The technology of hydrocracking heavier, condensed ring molecules for the production of high octane gasoline has been practiced at Billingham, England, and is well known. (Please see, "Gasoline Produced from Coal Tar Oils," vol. 49 of Industrial and Engineering Chemistry, April 1957, pages 673, 678.) High pressure hydrocracking of the heavier hydrocarbons is not immediately contemplated as part of the present invention.

It is important to remark that, for the very first time in the long history of the development of solid fuel distillation processes, a method is provided by the present invention whereby the yield of liquids under mild operating conditions is at least equal to the maximum volume obtainable from low temperature carbonization assay. At the same time, the character of the final distillate is stable and therefore predictable.

In general, bituminous coal tar and Rocky Mountain shale oil which have not suffered great, and usually accidental, thermal alteration by excessive exposure at temperatures of 900° F. and above have the following approximate composition:

|  | Percent of total distillate |
|---|---|
| Paraffins (chiefly cyclic) | 5 to 15 |
| Olefinic compounds (with the reactive double bonds occurring both in the side chains and in the cyclic nuclei of both the naphthenic and benzenoid series of compounds) | 15 to 50 |
| Tar acids and tar bases | 10 to 20 |
| Aromatics | 10 to 30 |
| Refractory pitch, boiling above 600° F. | 50 to 70 |

The final distillate of this invention from bituminous coal catalyzed under adequate hydrodealkylating conditions may be expected to have the following approximate analysis:

| | |
|---|---|
| Paraffins percent | 4.0 |
| Olefins | None |
| Aromatics (average molecular weight less than 115) percent | 95.0 |
| Pitch | None |
| Tar acids | None |
| Tar bases, chiefly pyridine and quinoline percent | 1.0 |
| Sulfur | Less than 100 p.p.m. |

In order to illustrate the great chemical complexity of distillate which is produced by conventional processes, and particularly so as to point up the very distinct advantages of immediate stabilization bituminous coal distillate, for example, presented herebelow is a list of the chief organic compounds which have been identified in coal tars and light oils. Several of the compounds listed in column three are recovered commercially in byproduct coke oven practice.

Column one identifies many of the compounds which exist in the distillate under mild vapor phase catalytic conditions. Column eight lists the final products when operating under the most severe hydrorefining and hydrodealkylating catalysis and indicates the initial compounds from which they are derived.

| Mild Conditions — Compound appearing in straight run coal still distillate | Classification of compound group | Name of compound | Compound formula | Compound retained under severe coal still conditions | Initial compound M.P., °C. | Initial compound Boiling point, °C. | Severe conditions — Final coal still distillate |
|---|---|---|---|---|---|---|---|
| Yes | Alkane | n-Pentane | $C_5H_{12}$ | No | | 36.2 | Hydrogen, methane, ethane, etc. |
| Yes | Naphthene | Cyclopentane | $C_5H_{10}$ | No | | 49.5 | Do. |
| No | cyclo-alkene | Cyclopentene | $C_5H_8$ | | | 44.2 | Do. |
| No | Alkene | Pentene-1 | $C_5H_{10}$ | No | | 29.9 | Do. |
| No | do | n-Hexylene | $C_6H_{12}$ | No | | 67.5 | Do. |
| No | Cyclo-olefin | 1-3 cyclopentadiene | $C_5H_6$ | No | | 42.5 | Do. |
| Yes | Alkane | n-Hexane | $C_6H_{14}$ | No | | 69.0 | Some benzene. |
| Yes | Aromatic | Benzene | $C_6H_6$ | Yes | 5.5 | 80.1 | Retained as benzene. |
| Yes | Naphthene | Cyclohexane | $C_6H_{16}$ | No | | 81.4 | Benzene. |
| No | | Thiophene | $C_4H_4S$ | No | | 84.1 | $H_2S$ + butane. |
| No | Cyclo-olefin | Cyclohexene | $C_6H_{10}$ | No | | 83.0 | Benzene. |
| No | | Diethylsulfide | $(C_2H^9)_2S$ | No | | 92.0 | $H_2S$ + ethane. |
| Yes | Alkane | n-Heptane | $C_7H_{16}$ | No | | 98.4 | Toluene. |
| Yes | Naphthene | Methyl-cyclohexane | $C_6H_{11}(CH_3)$ | No | | 100.3 | Toluene or benzene. |
| Yes | Aromatic | Toluene | $C_6H_5(CH_3)$ | Yes | −95 | 110.6 | Toluene or benzene. |
| Yes | Naphthene | 1,3 Dimethyl cyclohexane | $C_6H_{10}(CH_3)_2$ | No | | 121.0 | Xylene to benzene. |
| Yes | Naphthene | 1,4 Dimethyl cyclohexane | $C_6H_{12}(CH_3)_2$ | No | | 119.0 | Xylene to benzene. |
| Yes | do | Cycloheptane | $C_7H_{14}$ | No | | 118.1 | Light hydrocarbons. |
| Yes | Water soluble tar base. | Pyridine | $C_5H_5N$ | Yes | | 115.3 | Pyridine. |
| No | | 2-methyl-thiophene | $CH_3C_4H_3S$ | No | | 112.5 | $H_2S$+light HC's. |
| No | | 3-methyl-thiophene | $CH_3C_4H_3S$ | No | | 115.4 | Do. |
| Yes | Alkane | n-Octane | $C_8H_{18}$ | No | | 125.8 | Light HC's. |
| No | Alkene | Octylene | $C_8H_{16}$ | No | | 123 | Do. |
| Yes | Water soluble tar base. | 2-Picoline | $CH_2C_5H_4N$ | No | | 128 | Pyridine. |
| No | | Dimethyl-thiophene | $(CH_3)_2 C_4H_2S$ | No | | 136–138 | $H_2S$+light HC's. |
| Yes | Aromatic | Ethyl benzene | $C_6H_5C_2H_5$ | Yes | −93.9 | 136.15 | Ethyl benzene or benzene. |
| Yes | do | P-xylene | $C_6H_4(CH_3)_2$ | Yes | 13.2 | 138.4 | Xylene or benzene. |
| Yes | do | M-xylene | $C_6H_4(CH_3)_2$ | Yes | −53.6 | 139.1 | Do. |
| Yes | do | O-xylene | $C_6H_4(CH_3)_2$ | Yes | −29.0 | 144.4 | Do. |
| No | Aromatic; arylalkene. | Styrene | $C_6H_5CH:CH_2$ | No | | 146 | Ethyl benzene or benzene. |
| Yes | Water soluble tar bases. | Dimethyl-pyridines-lutidines. | $(CH_3)_2 C_5H_3N$ | No | | 143–163 | Pyridine. |
| Yes | Aromatic | Isopropylbenzene (Cumene). | $C_6H_5CH(CH_3)_2$ | No | −96.9 | 152.4 | Benzene or toluene. |
| Yes | do | Propyl benzene | $C_6H_5CH_3C_2H_5$ | No | −101.6 | 159.2 | Toluene or benzene. |
| Yes | do | Ethyl toluenes | $C_6H_4CH_3C_2H_5$ | No | | 161.2–164.9 | Toluene or benzene. |
| No | | Trimethyl-thiophene | $(CH_3)_3 C_4HS$ | No | | 163 | $H_2S$+light HC's. |
| Yes | do | Mesitylene | $C_6H_3(CH_3)_3$ | No | −52.7 | 164.7 | Toluene or benzene. |
| Yes | do | 1,2,4-trimethyl benzene (pseudocumene). | $C_6H_3(CH_3)_3$ | No | −57 | 169.3 | Do. |
| No | | Thiophenol | $C_6H_5SH$ | No | | 169.5 | $H_2S$+benzene. |
| No | Arylalkene | Dicyclo-pentadiene | $C_{10}H_{12}$ | No | −32.9 | 170 | Naphthalene. |
| Yes | Alkane | n-Decane | $C_{10}H_{22}$ | No | −30 | 174 | Light HC'S. |
| No | Tar acid | Coumarone | $C_8H_4OCH:CH$ | No | −18 | 174 | Toluene or benzene. |
| Yes | Aromatic | Hemimellitene | $(CH_3)_3C_6H_3$ | No | −15 | 176 | Do. |
| Yes | do | Iso propyl toluene (Cymenes). | $C_{10}H_{14}$ | No | | 175–176 | Do. |

| Mild Conditions Compound appearing in straight run coal still distillate | Classification of compound group | Name of compound | Compound formula | Compound retained under severe coal still conditions | Initial compound M.P.,° C. | Initial compound Boiling point,° C. | Severe conditions Final coal still distillate |
|---|---|---|---|---|---|---|---|
| Yes | Alicyclic | Indene | $C_6H_4CH_2CH:CH$ | No | −2 | 182.4 | Benzene. |
| Yes | Aromatic | 1,3,diethyl benzene | $C_6H_4(C_2H_5)_2$ | No | −20 | 181.1 | Do. |
| No | Tar acid | Phenol | $C_6H_5OH$ | No | 41 | 182 | Do. |
| Yes | Aromatic | 1,4,diethyl benzene | $C_6H_4(C_2H_5)_2$ | No | −20 | 183.7 | Do. |
| Yes | do | Durene | $(CH_3)_4C_6H_2$ | No | 80 | 194 | Toluene, xylene, or benzene. |
| No | Tar acid | O-cresol | $CH_3C_6H_4OH$ | No | 30 | 191.5 | Toluene or benzene. |
| No | do | M-cresol | $CH_3C_6H_4OH$ | No | 11 | 202.8 | Do. |
| No | do | P-cresol | $CH_3C_6H_4OH$ | No | 36 | 202.5 | Do. |
| Yes | Hydrogenated naphthaline. | Tetra hydro-naphthalene. | $C_{10}H_{12}$ | No | −30 | 207.2 | Naphthalene. |
| No | Tar acid | 2,4,xylenol | $(CH_3)_2C_6H_3OH$ | No | 26 | 211.5 | Xylene or benzene. |
| No | Tar base | m-Tolunitrile | $CH_3C_6H_4CN$ | No | −23 | 214 | $NH_3$+xylene or benzene. |
| No | do | o-Ethyl analine | $C_2H_5C_6H_4NH_2$ | No | −43 | 215 | Ethyl benzene or benzene. |
| No | Tar acid | 2,6, xylenol | $(CH_3)_2C_6H_3OH$ | No | 49 | 212 | Xylene or benzene. |
| No | do | 2,5 xylenol | $(CH_3)_2C_6H_3OH$ | No | 74.5 | 211.5 | Do. |
| Yes | Hydrogenated naphthaline. | 1,4 dihydro-naphthalene. | $C_{10}H_{18}$ | No | −43 | 194.6 | Naphthalene. |
| No | Tar base | 2,5 xylidine | $(CH_3)_2C_6H_3NH_2$ | No | 15.5 | 217 | $NH_3$+xylene to benzene. |
| No | do | 2,4 xylidine | $(CH_3)_2C_6H_3NH_2$ | No |  | 216 | Do. |
| Yes | Alkane | Dodecane | $CH_3(CH_2)_{10}CH_3$ |  | −12 | 214 | Possible ring formation. |
| No | Tar acid | m-Ethyl phenol | $C_2H_5C_6H_4OH$ | No | −4 | 214 | Ethyl benzene to benzene. |
| No | Tar base | p-Tolunitrile | $CH_3C_6H_4CN$ | No | 29.5 | 217 | $NH_3$+xylene to benzene. |
| No | Tar acid | p-Ethyl phenol | $C_2H_5C_6H_4OH$ | No | 46 | 219 | Ethyl benzene to benzene. |
| Yes | Bicyclic aromatic | Naphthalene | $C_{10}H_8$ | Yes | 80.2 | 218 | Naphthalene. |
| No | Tar acid | 2,3 xylenol | $(CH_3)_2C_6H_3OH$ | No | 75 | 218 | Xylene to benzene. |
| No | do | 3,5 xylenol | $(CH_3)_2C_6H_3OH$ | No | 68 | 219 | Do. |
| No | Tar base | 3,5 xylidine | $(CH_3)_2C_6H_3NH_2$ | No |  | 221 | $NH_3$+xylene to benzene. |
| No | Tar acid | o-Propyl phenol | $C_3H_7C_6H_4OH$ | No |  | 220 | Propyl benzene to benzene. |
| No | do | Mesitol | $(CH_3)_3C_6H_2OH$ | No | 69 | 220 | Mesitylene to benzene. |
| No |  | Thio naphthalene | $C_6H_4SCH:CH$ | No | 32 | 221 | $H_2S$+ethyl benzene to benzene. |
| No | Tar Base | 2,3, xylidine | $(CH_3)_2C_6H_3NH_2$ | No | −15 | 223.8 | $NH_3$+xylene to benzene. |
| No | Tar acid | 3,4, xylenol | $(CH_3)_2C_6H_3OH$ | No | 65 | 225 | Xylene to benzene. |
| No | do | m-Propyl phenol | $C_3H_7C_6H_4OH$ | No | 26 | 228 | Propyl benzene to benzene. |
| No | do | p-Isopropyl-phenol | $(CH_3)_2CHC_6H_4OH$ | No | 61 | 229 | Do. |
| No | do | p-Propyl phenol | $C_3H_7C_6H_4OH$ | No | 22 | 232 | Do. |
| No | do | Pseudocumenol | $(CH_3)_3C_6H_2OH$ | No | 72 | 235 | Mesitylene to benzene. |
| Yes | Tar base | Quinoline | $C_6H_4N:CHCH:CH$ | Yes | −19 | 237 | Quinoline. |
| Yes | Aromatic | 2-methyl-naphthalene | $C_{10}H_7CH_3$ | No | 35 | 245 | Naphthalene. |
| Yes | Tar base | Isoquinoline | $C_6H_4CH:NCH:CH$ | Yes | 23 | 243 | Isoquinoline. |
| Yes | do | Quinaldine | $CH_3C_9H_6N$ | No |  | 246 | Quinoline. |
| Yes | do | Lepidine | $CH_3C_9H_6N$ | No | −1 | 260 | Do. |
| Yes | Aromatic | Dimethyl-naphthalene | $C_{10}H_6(CH_3)_2$ | No |  | 255−270 | Naphthalene. |
| No |  | Acenaphthene | $C_{10}H_6(CH_2)_2$ | No | 95 | 277.5 | Do. |
| No | Tar acid | 1-naphthol | $C_{10}H_7OH$ | No | 96 | 288 | Do. |
| No | do | 2-naphthol | $C_{10}H_7OH$ | No | 122 | 295 | Do. |
| Yes | Alicyclic | Fluorene | $C_6H_4CH_2C_6H_4$ | No | 116 | 295 | Two mols benzene or one mol naphthalene |
| Yes | 3-ring aromatic | Phenanthrene | $C_{14}H_{10}$ | Yes | 100 | 340 | Phenanthrene. |
| Yes | do | Anthracene | $C_{14}H_{10}$ | Yes | 217 | 354 | Anthracene. |
| Yes | Tar base | Acridine | $C_6H_4CH:NC_6H_4$ | Yes | 108 | 346 | Acridine. |
| No | do | Carbazole | $C_6H_4NHC_6H_4$ | No | 246 | 354 | $NH_3$+two mols Benzene or one mol naphthalene. |
| Yes | 4-ring aromatic | Pyrene | $C_{16}H_{10}$ | Yes | 150 | 393 | Pyrene. |
| Yes | do | Chrysene | $C_{18}H_{12}$ | Yes | 258 | 448 | Chrysene. |

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A method for hydrogenation by contact catalysis of the primary vapors destructively distilled from initially solid hydrocarbonaceous materials to circumvent polymerization and other subsequent liquid phase intermolecular reactions in the distillate, comprising; thermally exposing an initially solid hydrocarbonaceous material containing carbon, hydrogen, oxygen, nitrogen and sulfur, to distill therefrom without serious subsequent thermal reaction in the distillate, volatile materials in the vapor phase, the volatile materials including gas and a condensible liquid vapor, contacting hydrogen and the initial vapor phase products while they are still in the initial vapor phase with a suitable solid catalyst in order to saturate the unsaturated, reactive hydrocarbons and to remove organically combined oxygen as water vapor.

2. A method as defined in claim 1 wherein the hydrogen is preheated.

3. A method for initial vapor phase catalysis of primary volatile matter destructively distilled from initially solid hydrocarbonaceous materials to prevent polymerization and other detrimental liquid phase intermolecular reactions, the method comprising; providing an initially solid hydrocarbonaceous material of the type containing carbon, hydrogen, oxygen, nitrogen and sulfur, heating the initially solid hydrocarbonaceous material by sufficient thermal exposure to distill vapors therefrom without thermal alteration in the vapor phase, the initial vapor phase products being split into fragments having molecular weight of less than 300 which are highly reactive because of the unsaturation of the hydrocarbons therein and the presence of oxygen in organic combination, combining hydrogen with the vapor phase product while still in the initial vapor phase, and contacting the mixture of hydrogen and initial vapor phase distillation products with a suitable solid catalyst to accomplish saturation of the olefinic hydrocarbons and remove oxygen from organic combination.

4. A method for hydrogenation by contact catalysis of the primary vapors destructively distilled from initially solid hydrocarbonaceous materials to circumvent polymerization and other subsequent liquid phase intermolecular reactions in the distillate, comprising; thermally exposing an initially solid hydrocarbonaceous material containing carbon, hydrogen, oxygen, nitrogen and sulfur, to distill therefrom without serious subsequent thermal reaction in the distillate, volatile materials in the vapor phase, the volatile materials including gas and a condensible liquid vapor, introducing hydrogen gas into said volatile materials in the vapor phase subsequent to said thermal exposure, contacting the resulting mixture of hydrogen and the initial vapor phase products while they are still in the initial vapor phase with a suitable solid catalyst in order to saturate the unsaturated, reactive hydrocarbons and to remove organically combined oxygen as water vapor, the addition of hydrogen gas being confined to a point in the process after the thermal exposing step and before the contacting of the mixture of hydrogen and the vapor phase product with the solid catalyst.

References Cited by the Examiner

UNITED STATES PATENTS

| | | | |
|---|---|---|---|
| 1,960,972 | 5/1934 | Grimm et al. | 208—8 |
| 2,474,345 | 7/1949 | Clark et al. | 208—11 |
| 2,657,124 | 10/1953 | Gavcher | 48—197 |
| 2,662,005 | 12/1953 | Evans | 48—197 |
| 2,694,037 | 11/1954 | Johnson et al. | 202—6 |
| 2,885,338 | 5/1959 | Evans | 202—6 |
| 2,895,896 | 7/1959 | Vander Ploeg | 48—197 |
| 2,898,272 | 8/1959 | Odell | 208—6 |
| 2,934,476 | 4/1960 | Zvejnieks | 48—197 |
| 2,991,164 | 7/1961 | Elliott et al. | 208—11 |
| 3,106,521 | 10/1963 | Huntington | 208—11 |
| 3,107,985 | 10/1963 | Huntington | 48—197 |

FOREIGN PATENTS

| | | |
|---|---|---|
| 450,168 | 7/1948 | Canada. |
| 171,785 | 11/1921 | Great Britain. |

DELBERT E. GANTZ, *Primary Examiner.*

ALPHONSO D. SULLIVAN, PAUL M. COUGHLAN,
*Examiners.*

S. P. JONES, *Assistant Examiner.*